United States Patent [19]
Anthony

[11] 3,762,061
[45] Oct. 2, 1973

[54] GEAR CHECKER

[75] Inventor: Russell W. Anthony, Harper Woods, Mich.

[73] Assignee: Lear Siegler, Inc., Santa Monica, Calif.

[22] Filed: June 11, 1971

[21] Appl. No.: 152,114

[52] U.S. Cl. .......... 33/179.5 R, 33/179.5 B, 209/82
[51] Int. Cl. ........................... G01b 5/08, G01b 7/12
[58] Field of Search ............... 33/179.5 B, 179.5 R, 33/179.5 C, 174 E, 174 Q, 147 L; 214/330, 1 BB; 209/82

[56] References Cited
UNITED STATES PATENTS 2,563,910   8/1951   Bean .............................. 33/179.5 B
3,115,712   12/1963  Hoshizaki ....................... 33/179.5 B

*Primary Examiner*—Robert B. Hull
*Assistant Examiner*—Richard R. Stearns
*Attorney*—Charles R. McKinley et al.

[57] ABSTRACT

A gear checker through which a succession of work gears passes on the way to a gear finishing machine, the checker being adapted to monitor gear size, root diameter, helix angle, incompletely cut gears, and malformed teeth by rolling in mesh with a master gear and in contact with a smooth roller.

3 Claims, 3 Drawing Figures

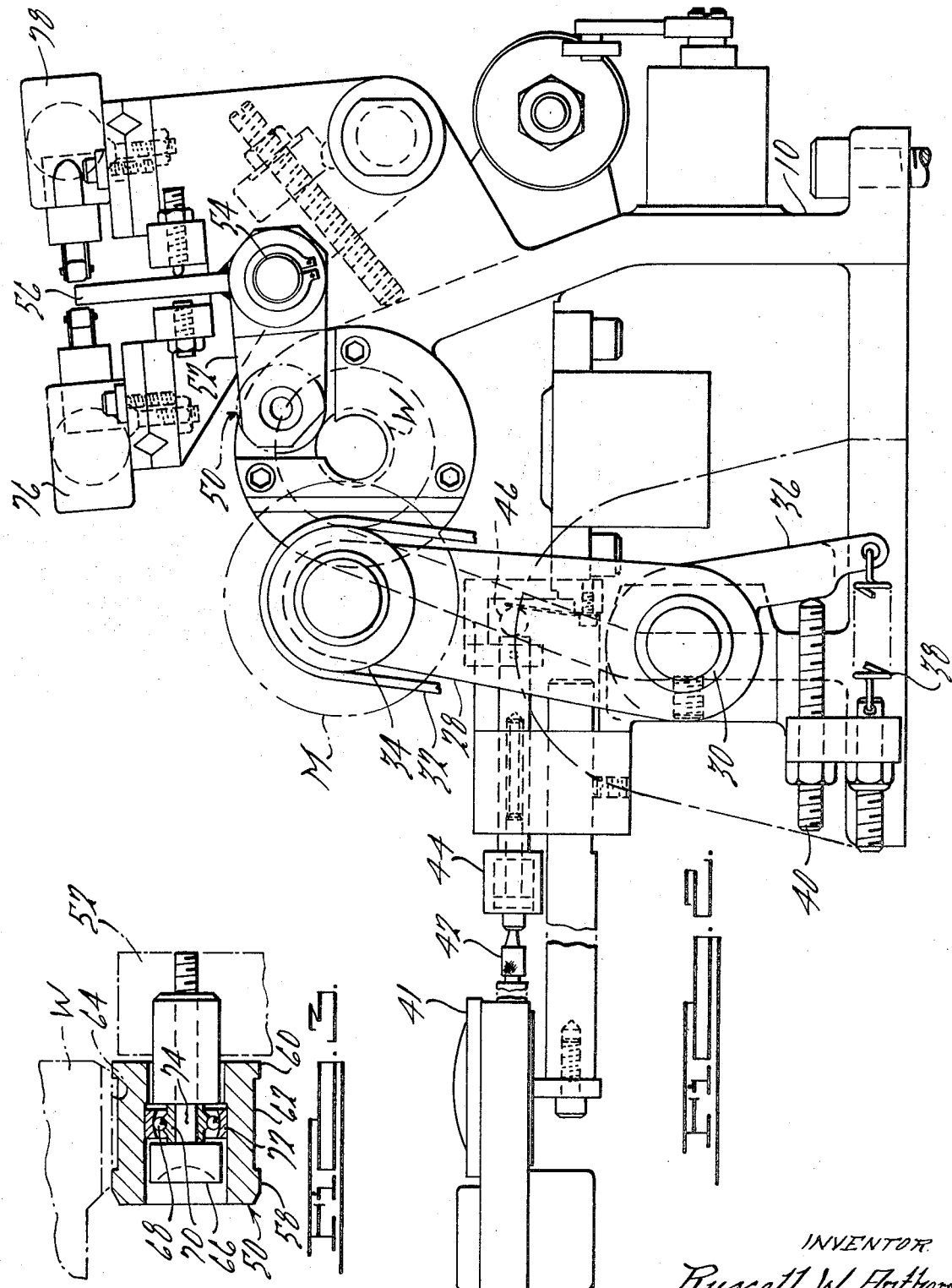

GEAR CHECKER

BRIEF SUMMARY OF THE INVENTION

The automatic production of finished gears requires automatic loading of a succession of previously rough cut gears to a gear finishing machine such as, for example a gear shaver, a gear honer, or a gear finish rolling machine. Since these gears are fed automatically to the loader, it is essential to provide means for eliminating gears exhibiting certain errors or defects, so as to prevent damage to the gear finishing machine.

This is accomplished in general by causing each gear to be advanced into mesh with a master gear which is driven in rotation to effect at least a complete 360° rotation of the work gear, in tight mesh, while observing relative movement between the work gear and master gear. This essentially measures the size of the work gear although it will be appreciated that if the work gear has a helix angle error, tight meshing engagement will be accomplished at an increased center distance. Similarly, shaper cut gears in which the shaper cutting operation has not been continued completely around the gear, or hobbing operations in which the gear has not been hobbed sufficiently across its face width, will be determined by center distance displacement.

In the event that the teeth are malformed, as by having the top end portion of all teeth at one end cut away by hobbing, as sometimes occurs, this is determined by rolling a smooth roller in contact with the outside diameters of the work gears, the roller being mounted for rocking movement about an axis perpendicular to and intersecting its own axis midway between its ends.

BRIEF DESCRIPTION OF THE DRAWINGS

FIG. 2 is a side elevation of the checker.

FIG. 3 is a sectional view showing the mounting of the smooth roller.

DETAILED DESCRIPTION

Figure 1:
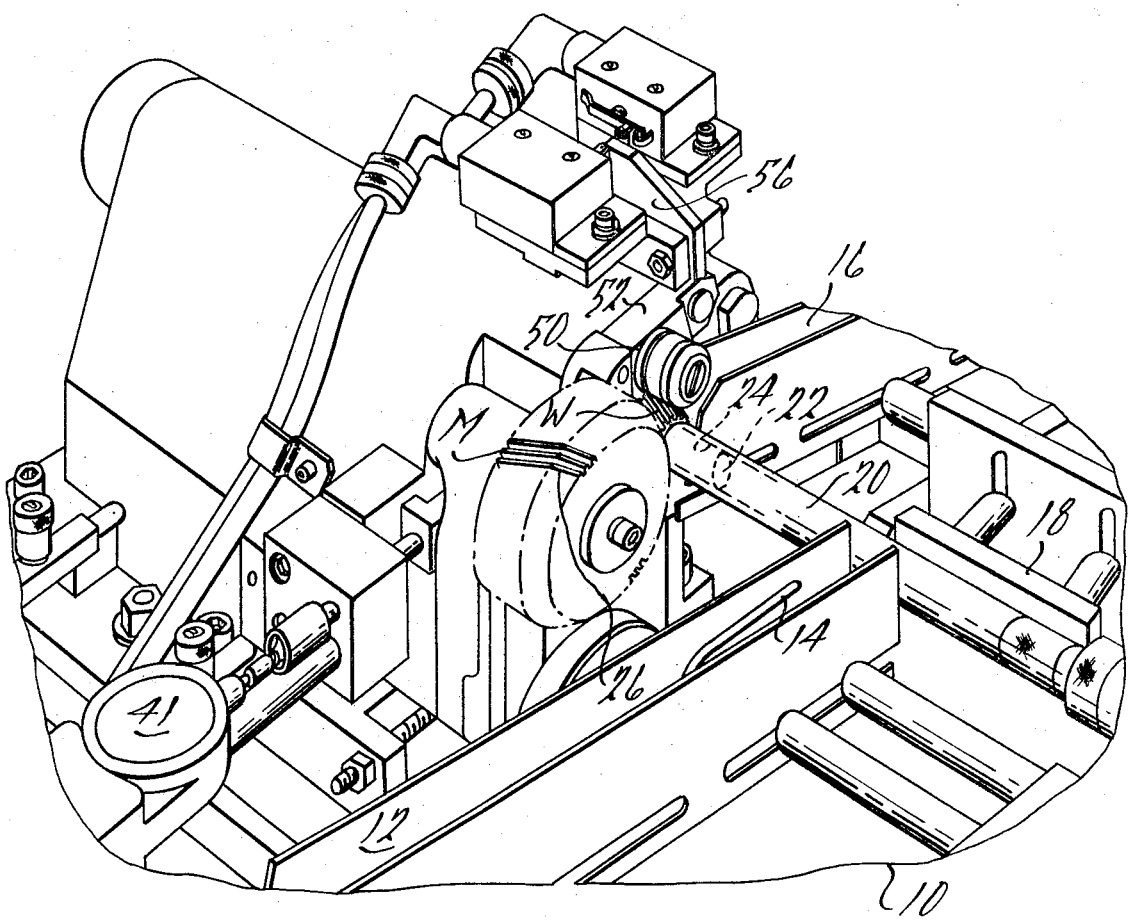
FIG. 1 is a fragmentary perspective view of the gear checker.

Referring first to FIG. 1 the checker comprises a frame 10 which includes an inlet chute 12 along which gears are advanced sequentially into position to be checked. The chute includes a pivoted trigger 14 adapted to be actuated by passage of a gear thereover so as to control movement of the gear carrying mechanism.

After checking a work gear is discharged from the checker through an outlet chute 16 and conventional means may be provided for diverting gears which have been determined as unsuitable for the finishing operation from those which are satisfactory and which are advanced to the gear finishing machine.

Gears rolling down the inclined chute 12 come to rest against a stop plate 18. At this time a tubular shaft 20 is retracted to the right from the position seen in FIG. 1 so that the free end of this shaft is spaced to the right of a work gear discharged from the chute 12 and resting against the stop plate 18.

Associated with the tubular shaft 20 is an arbor 22 having a free end portion adapted to enter the opening or recess 24 provided in the free end of the shaft 20. The arbor 22 in addition to having the reduced end portion as seen in FIG. 1, has an annular shoulder which is engageable with the opposite side of the work gear W when the gear is loaded onto the arbor by the tubular shaft 20.

Suitable means such as fluid cylinders (not shown) are separately connected to the tubular shaft 20 and the arbor 22 for effecting independent movement thereof.

In operation, after a work gear has been discharged from the chute 16, the tubular shaft 20 and the arbor 22 are moved to the right from the position illustrated in FIG. 1 so that the adjacent ends thereof are spaced apart at opposite sides of the next succeeding work gear. In a cycle initiated by tripping the trigger 14, the tubular shaft 20 advances to the left as seen in FIG. 1 and moves the work gear W onto the end of the arbor 22 and into engagement with the annular shoulder thereon. Continued movement of the tubular shaft 20 moves the work gear and arbor as a unit to the operating position illustrated in FIG. 1.

It will be observed that in this position the work gear W is in mesh with a master gear M, the teeth of which at one end as indicated at 26 are tapered to facilitate meshing engagement of the work gear W with the master gear M.

The master gear M is mounted on the frame 10 by a pivoted arm 28, the pivot support for which is indicated at 30. The master gear M is adapted to be driven in rotation by suitable means such for example as a flexible driving member or belt 32 cooperating with a sheave 34 driven from a sheave concentric with the axis of the pivot mounting 30. Accordingly, the drive connection is not disturbed as the arm 28 is swung during the checking operation.

The arm 28 is biased in a clockwise direction as seen in FIG. 2 by means of an actuating arm 36 connected to a tension spring indicated at 38. An adjustable stop screw 40 is provided which is engageable with the actuating arm 36 to limit clockwise movement of the arm 28 while no work gear W occupies the working position.

Means are provided for sensing the position of the arm 28 during the checking cycle and this means comprises a measuring device 41 which may have an indicator dial and needle thereon or which may simply respond to movement of its actuating plunger 42 to operate electronic or other sensitive measuring instrumentalities. Movement of the arm 28 is transmitted to longitudinally slidable accurately guided adjustable motion transmitting means 44 from an abutment 46 provided on the arm 28.

With this construction, as the master gear M is rotated sufficiently to produce at least a 360° rotation of the work gear W, the teeth of the master gear and work gear are in tight mesh so that the position of the arm 28 is determined essentially by the size of the work gear W. However, if the work gear exhibits eccentricity it will of course be apparent that the arm 28 will swing back and forth during each complete rotation of the work gear. Thus, while the work gear might be of correct pitch diameter, it will be rejected as oversize due to displacement of the arm 28 as the high side of the work gear passes through mesh with the master gear. Similarly, if the rough cutting operation of the work gear was not completely finished, this will result in displacement of the arm 28 beyond its normal position and will result in rejection of the work gear.

Means are also provided on the checker for determining a malformed condition of the gear teeth by roller means engaging the crests of the teeth. This is for the purpose of determining errors in which the outside diameter of the teeth at one end have been partly cut away by an incorrectly set of hobbing operations.

This checking operation is accomplished by a smooth roller 50 carried by an arm 52 pivoted as indicated at 54 and having an actuating arm 56 thereon. The roller 50, as best seen in FIG. 3, is provided with cylindrical bearing surfaces 58 and 60 at opposite ends separated by a reduced or relieved annular zone 62. As seen in this Figure, the cylindrical bearing surfaces 58 and 60 are engageable with the teeth 64 of the work gear W only adjacent the ends of the teeth.

The roller 50 is connected to the arm 52 by a projecting stud 66 having a spherical bearing connecting the stud to the roller 50. This bearing includes balls 68 interposed between an inner race 70 and an outer race 72 having an inner spherically formed annular bearing surface provided thereat. The center of curvature of the inner spherical bearing surface is indicated at 74 and is on the axis of the roller 50 midway between the ends thereof.

With this arrangement it will be observed that if both ends of the teeth 64 of the work gear W are of the required height or conform to a required outside diameter, then the roller 50 will remain in the position illustrated in FIG. 3. However, if one end of the teeth of the work gear is of the correct size or outside diameter while the other end of the teeth is either undersize or oversize, then the end of the roller will tip about its pivot center 74 and there will be a movement of the support arm 52.

The actuating arm 56 is interposed between a pair of sensitive measuring devices 76 and 78 so that movement of the arm 56 by a predetermined amount in either direction from the position illustrated in FIG. 2 will result in actuation of one or the other of the measuring devices 76 and 78.

It will be understood that the measuring device 40 and the measuring devices 76 and 78 are suitably connected to control means operable to divert unacceptable gears from the path of advance from the gear checker to the gear finishing machine.

I claim:

1. A gear checker for determining a malformed gear having the crests of some or all of the teeth at the ends thereof adjacent one side of the gear located at a greater or smaller radius than required comprising means for supporting and rotating a work gear on a fixed axis, a roller having axially spaced circular portions of greater diameter than the portion intermediate said spaced portions engageable with the periphery of the work gear adjacent the sides thereof, roller support structure pivoted about a fixed axis, means supporting said roller on said structure for rotation about the axis of said roller and for tilting motion of said roller on said structure about a pivot axis perpendicular to and intersecting the axis of said roller centrally of said roller to provide for engagement of said circular portions with the crests of the teeth of the work gear adjacent opposite ends thereof even though the the crests of the gear teeth adjacent one side of the gear are located at a different radius than that occupied by the crests of the teeth adjacent the other side of the gear, and means for sensing the position of said structure.

2. A checker as defined in claim 1 wherein the sensing means comprises a pair of opposed sensing devices located at opposite sides of a portion of said roller support structure, the said portion of said roller support structure being movable in opposite directions to actuate one or the other of said devices when the crests of some or all of the ends of the gear teeth adjacent one side of the gear are located at a greater or smaller distance from the axis of the gear than required.

3. A checker as defined in claim 2 in which said roller support structure and roller are positioned to be biased by gravity into engagement with the periphery of work gears.

* * * * *